(12) United States Patent
Brooks

(10) Patent No.: US 12,045,999 B2
(45) Date of Patent: Jul. 23, 2024

(54) DETERMINING A DURATION OF TIME IN WHICH AN INDIVIDUAL OBSERVED A REGION

(71) Applicant: Toyota Research Institute, Inc., Los Altos, CA (US)

(72) Inventor: Daniel J. Brooks, Arlington, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 561 days.

(21) Appl. No.: 17/376,342

(22) Filed: Jul. 15, 2021

(65) Prior Publication Data

US 2023/0018747 A1 Jan. 19, 2023

(51) Int. Cl.
*G06T 7/73* (2017.01)
*G06F 3/01* (2006.01)
(Continued)

(52) U.S. Cl.
CPC ............... *G06T 7/73* (2017.01); *G06F 3/013* (2013.01); *G06K 7/1413* (2013.01);
(Continued)

(58) Field of Classification Search
CPC ............... G02B 27/0093; G02B 27/36; G02B 2027/0185; G02B 27/0179; G06F 3/013; G06F 3/04817; G06K 7/1413; G06K 7/1417; G06K 9/00791; G06T 2207/30204; G06T 7/246; G06T 7/60; G06T 7/73; G06V 20/59; G06V 40/18; B60K 2370/193;
(Continued)

(56) References Cited

U.S. PATENT DOCUMENTS

| 7,646,899 B2 | 1/2010 | Fitzpatrick |
| 2015/0356737 A1 | 12/2015 | Ellsworth et al. |
| 2021/0056306 A1* | 2/2021 | Hu ...................... G06V 40/193 |

FOREIGN PATENT DOCUMENTS

WO 2020140387 A1 7/2020

OTHER PUBLICATIONS

T. Langner, D. Seifert, B. Fischer, D. Goehring, T. Ganjineh and R. Rojas, "Traffic awareness driver assistance based on stereovision, eye-tracking, and head-up display," 2016 IEEE International Conference on Robotics and Automation (ICRA), Stockholm, Sweden, 2016, pp. 3167-3173 (Year: 2016).*

(Continued)

*Primary Examiner* — Michael J Vanchy, Jr.
(74) *Attorney, Agent, or Firm* — Christopher G. Darrow; Darrow Mustafa PC

(57) ABSTRACT

A duration of time in which an individual observed a region can be determined. An image can be received. The image can include an indication of a point of gaze of the individual at a production time of the image. The image can include a visual fiducial marker, which can be disposed at a position in the image and can include a visual symbol. The visual symbol can be associated with data that define the region. The region can have a shape and a size and can be disposed a displacement in a direction from a position of the visual fiducial marker. Using the visual symbol, a location of an edge of the region can be determined. The indication of the point of gaze can be determined to be within the region. The production time of the image can be determined to be within the duration of time.

20 Claims, 7 Drawing Sheets

(51) Int. Cl.
*G06K 7/14* (2006.01)
*G06T 7/60* (2017.01)
(52) U.S. Cl.
CPC .............. *G06K 7/1417* (2013.01); *G06T 7/60* (2013.01); *G06T 2207/30204* (2013.01)
(58) Field of Classification Search
CPC .... B60K 2370/347; B60K 35/00; B60R 1/00; G03B 15/00; G03B 17/02; G03B 17/18; G03B 7/00; G03B 7/28; H04N 5/225; H04N 5/33; H04N 7/18
See application file for complete search history.

(56) References Cited

OTHER PUBLICATIONS

A. Bykowski and S. Kupiński, "Feature matching and ArUco markers application in mobile eye tracking studies," 2018 Signal Processing: Algorithms, Architectures, Arrangements, and Applications (SPA), Poznan, Poland, 2018, pp. 255-260, (Year: 2018).*

Alan B. Craig, "Understanding Augmented Reality: Concepts and Applications," Morgan Kaufmann Publishers Inc., 2013, pp. 1-272.

Unknown, "Tobii Pro Glasses 2—Discontinued" 11 pages, last accessed May 2021, found at https://www.tobiipro.com/product-listing/tobii-pro-glasses-2/.

Unknown, "ARTag" 2 pages, last accessed on May 4, 2020, found at https://en.wikipedia.org/wiki/ARTag.

Rosenhahn et al., "Three-Dimensional Shape Knowledge for Joint Image Segmentation and Pose Tracking," International Journal of Computer Vision, vol. 73, 2007, pp. 1-30.

Unknown, "Eye tracking" 19 pages, last accessed on Apr. 28, 2021, found at https://en.wikipedia.org/wiki/Eye_tracking.

Unknown, "Fiducial marker" 6 pages, last accessed on Apr. 21, 2021, found at https://en.wikipedia.org/wiki/Fiducial_marker.

Wu et al., "SEQIT: Visualizing Sequences of Interest in Eye Tracking Data," IEEE Conference on Information Visualization (InfoVis), Chicago, USA, 2015, pp. 449-458.

* cited by examiner

DETERMINING A DURATION OF TIME IN WHICH AN INDIVIDUAL OBSERVED A REGION

TECHNICAL FIELD

The disclosed technologies are directed to determining a duration of time in which an individual observed a region in an environment. Specifically, the disclosed technologies are directed to processing an image of the environment that includes an indication of a point of gaze of the individual, added to the image, and a visual fiducial marker, which is in the environment and includes a visual symbol that is associated with data that define a shape of the region, a size of the region, and a displacement of the region in a direction from a position of the visual fiducial marker, to determine if the point of gaze is within the region.

BACKGROUND

Durations of time in which an individual observed one or more regions can be determined from a sequence of images that includes indications of points of gaze of the individual. For example, such a sequence of images can be produced by an eye point-of-gaze tracking device worn by the individual. For example, the eye point-of-gaze tracking device can include wearable eye tracker glasses. Conventionally, each image in the sequence of images can be reviewed by a human to determine if an indication of the point of gaze of the individual is within one of the one or more regions. Based on a rate at which images in the sequence of images are produced, durations of time in which the individual observed the one or more regions can be determined. A timeline for the durations of time can be produced. Using such a timeline an order in which the individual observes different items of information presented to the individual can be determined.

SUMMARY

In an embodiment, a system for determining a duration of time in which an individual observed a region can include one or more processors, a data store, and a memory. The one or more processors can be configured to receive an image. The image can include an indication of a point of gaze of the individual at a time of a production of the image. The image can include a visual fiducial marker. The visual fiducial marker can be disposed at a position in the image. The visual fiducial marker can include a visual symbol. The visual symbol can be associated with data that define the region. The region can have a shape and a size. The region can be disposed a displacement in a direction from a position of the visual fiducial marker. A measurement of the displacement can be one or more of a multiple of a measurement of a size of the visual fiducial marker or a multiple of a measurement of a size of the visual symbol. The data store can be communicably coupled to the one or more processors. The data store can be configured to store the image. The memory can be communicably coupled to the one or more processors. The memory can store a region locator module, a matching module, and a determination module. The region locator module can include instructions that when executed by the one or more processors cause the one or more processors to determine, using the visual symbol, one or more locations of one or more edges of the region in the image. The matching module can include instructions that when executed by the one or more processors cause the one or more processors to determine that the indication of the point of gaze is within the region. The determination module can include instructions that when executed by the one or more processors cause the one or more processors to determine that the time of the production of the image is within the duration of time in which the individual observed the region.

In another embodiment, a method for determining a duration of time in which an individual observed a region can include receiving, by a processor, an image. The image can include an indication of a point of gaze of the individual at a time of a production of the image. The image can include a visual fiducial marker. The visual fiducial marker can be disposed at a position in the image and can include a visual symbol. The visual symbol can be associated with data that define the region. The region can have a shape and a size. The region can be disposed a displacement in a direction from a position of the visual fiducial marker. A measurement of the displacement can be one or more of a multiple of a measurement of a size of the visual fiducial marker or a multiple of a measurement of a size of the visual symbol. The method can include determining, by the processor, using the visual symbol, one or more locations of one or more edges of the region in the image. The method can include determining, by the processor, that the indication of the point of gaze is within the region. The method can include determining, by the processor, that the time of the production of the image is within the duration of time in which the individual observed the region.

In another embodiment, a non-transitory computer-readable medium for determining a duration of time in which an individual observed a region can include instructions that when executed by one or more processors cause the one or more processors to receive an image. The image can include an indication of a point of gaze of the individual at a time of a production of the image. The image can include a visual fiducial marker. The visual fiducial marker can be disposed at a position in the image and can include a visual symbol. The visual symbol can be associated with data that define the region. The region can have a shape and a size. The region can be disposed a displacement in a direction from a position of the visual fiducial marker. A measurement of the displacement can be one or more of a multiple of a measurement of a size of the visual fiducial marker or a multiple of a measurement of a size of the visual symbol. The non-transitory computer-readable medium can include instructions that when executed by the one or more processors cause the one or more processors to determine, using the visual symbol, one or more locations of one or more edges of the region in the image. The non-transitory computer-readable medium can include instructions that when executed by the one or more processors cause the one or more processors to determine that the indication of the point of gaze is within the region. The non-transitory computer-readable medium can include instructions that when executed by the one or more processors cause the one or more processors to determine that the time of the production of the image is within the duration of time in which the individual observed the region.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies are directed to determining a duration of time in which an individual observed a region in an environment. An image of the environment can be received by a processor. The image can include an indication of a point of gaze of the individual at a time of a production of the image. The indication of the point of gaze can have been added to the image of the environment. The image can include a visual fiducial marker, which is in the environment. The visual fiducial marker can be disposed at a position in the image and can include a visual symbol. The visual symbol can be associated with data that define the region. The region can have a shape and a size and can be disposed a displacement in a direction from the position of the visual fiducial marker. A measurement of the displacement can be one or more of a multiple of a measurement of a size of the visual fiducial marker or a multiple of a measurement of a size of the visual symbol. By having the measurement of the displacement be one or more of the multiple of the measurement of the size of the visual fiducial marker or the multiple of the measurement of the size of the visual symbol, the shape and the size of the region in the image and a position of the region in the image at the displacement in the direction from the position of the visual fiducial marker in the image can account for a difference in scale between the position of the region and the position of the visual fiducial marker in the image and a corresponding position of the region and a corresponding position of the visual fiducial marker in an environment in which the image was produced. Using the visual symbol, the processor can determine one or more locations of one or more edges of the region. The processor can determine that the indication of the point of gaze is within the region. The processor can determine that the time of the production of the image is within the duration of time in which the individual observed the region. In this manner, the processor can determine that the indication of the point of gaze is within the region regardless of an appearance of an object within the region. Thus, the image can be processed with segmentation by regions rather than by objects. Furthermore, if the appearance of the object within the region is known, then the processor can determine that the point of gaze may have been directed at the object.

Figure 1:
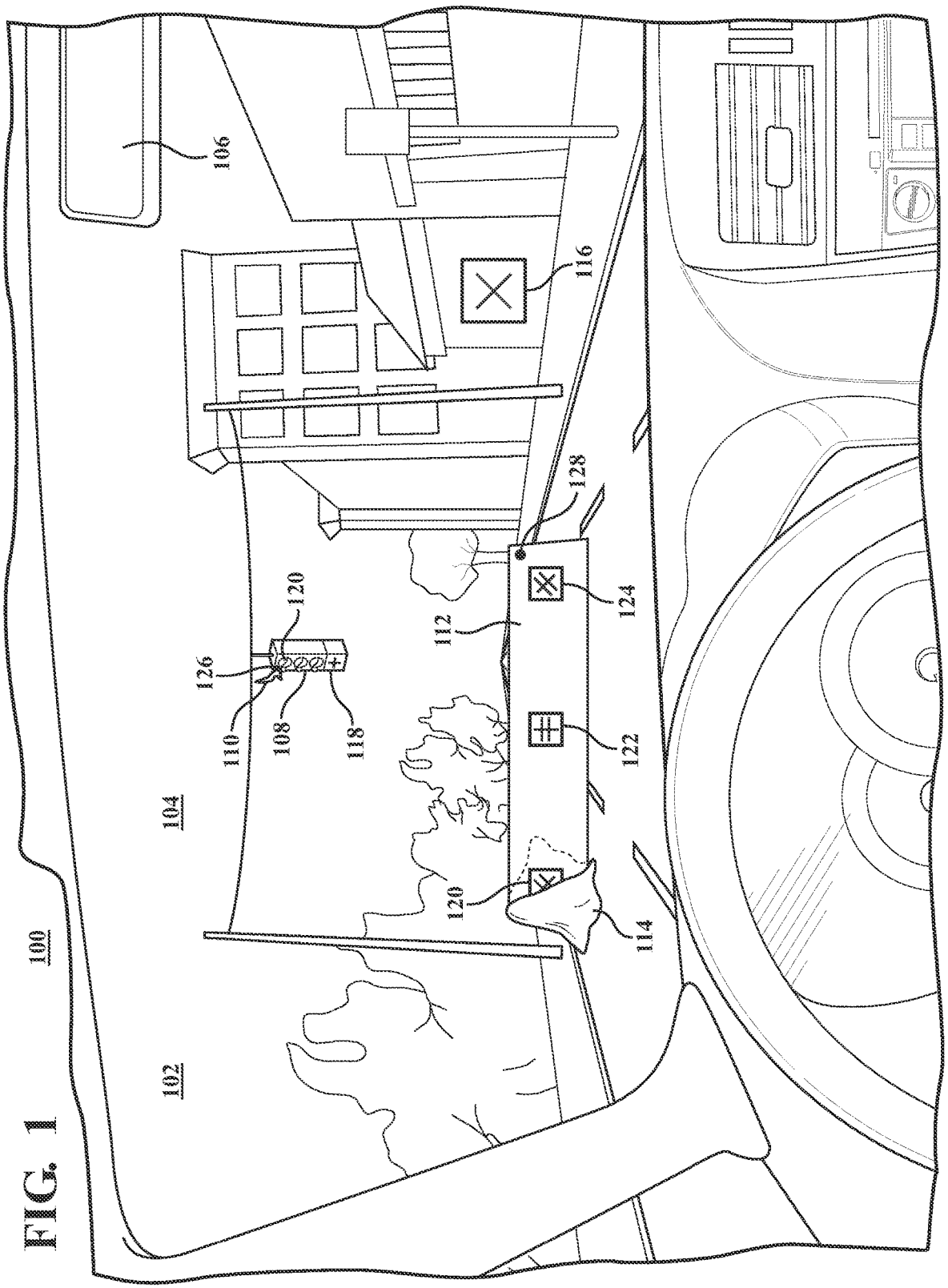
FIG. 1 is a diagram that includes an image of an example of an environment in which a duration of time in which an individual observed a region can be determined, according to the disclosed technologies.

FIG. 1 is a diagram that includes an image 100 of an example of an environment 102 in which a duration of time in which an individual observed a region can be determined, according to the disclosed technologies. For example, the image 100 can include a windshield 104, a rearview mirror 106, a traffic light 108, a bird 110, a barricade 112, and a tarp 114. A first visual fiducial marker 116 can be disposed on the windshield 104. A second visual fiducial marker 118 can be disposed on the traffic light 108. A third visual fiducial marker 120 can be disposed at a left side of the barricade 112. A fourth visual fiducial marker 122 can be disposed at a middle of the barricade 112. A fifth visual fiducial marker 124 can be disposed at a right side of the barricade 112. For example, at a time of a production of the image 100 (e.g., a time at which a frame in a video was produced), in the environment 102 a gust of wind can have caused the traffic light 108 to have rotated from its normal position and can have caused the tarp 114 to blow such that a portion of the third visual fiducial marker 120 can be occluded in the image 100. For example, the image 100 can have been produced by an eye point-of-gaze tracking device (not illustrated) worn by an individual. For a first illustrative purpose, the image 100 can include a first indication 126 of a point of gaze of the individual at the time of the production of the image 100. For a second illustrative purpose, the image 100 can include a second indication 128 of the point of gaze of the individual at the time of the production of the image.

Figure 2:
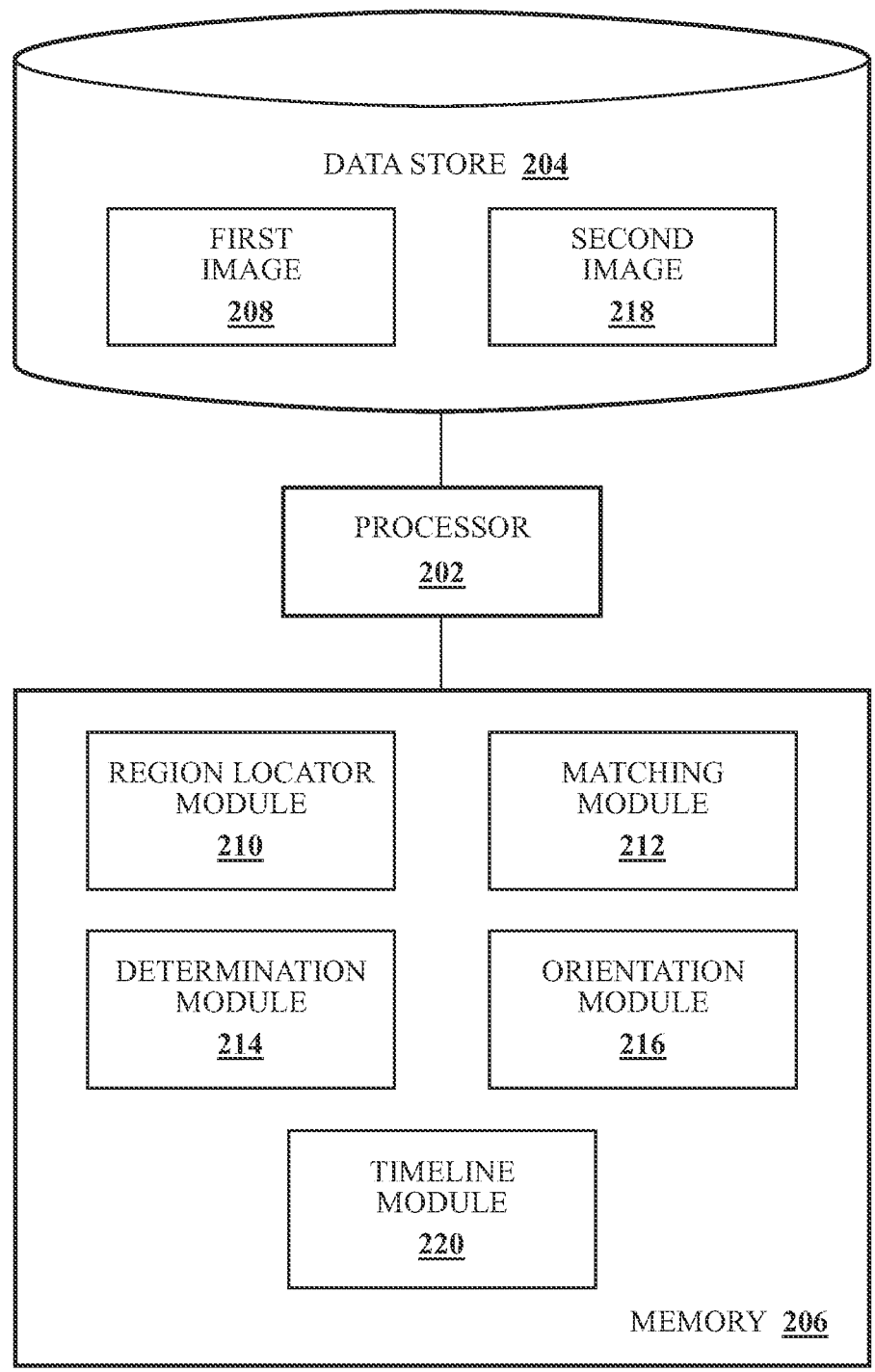
FIG. 2 is a block diagram that illustrates an example of a system for determining a duration of time in which an individual observed a region, according to the disclosed technologies.

FIG. 2 is a block diagram that illustrates an example of a system 200 for determining a duration of time in which an individual observed a region, according to the disclosed technologies. The system 200 can include, for example, a processor 202, a data store 204, and a memory 206. The data store 204 can be communicably coupled to the processor 202. The data store 204 can be configured to store, for example, a first image 208. The memory 206 can be communicably coupled to the processor 202. The memory 206 can store, for example, a region locator module 210, a matching module 212, and a determination module 214.

The processor 202 can be configured to receive the first image 208. For example, the processor 202 can be configured to receive the first image 208 from an eye point-of-gaze tracking device (not illustrated) worn by the individual. For example, the eye point-of-gaze tracking device can include wearable eye tracker glasses. For example, the wearable eye tracker glasses can be Tobii Pro Glasses 3 distributed by Tobii of Stockholm, Sweden. The first image 208 can include an indication of a point of gaze of the individual at a time of a production of the first image 208. The first image 208 can include a first visual fiducial marker. The first visual fiducial marker can be disposed at a first position in the first image 208 and can include a first visual symbol. The first visual symbol can be associated with first data that define a first region. For example, the first visual symbol can include one or more of a bar code, a QR code, an ARTag code, an AprilTag code, an ARToolKit code, an ArUco code, or the like. The first region can have a first shape and a first size. The first region can be disposed a first displacement in a first direction from a position of the first visual fiducial marker. A measurement of the first displacement can be one or more of a first multiple of a measurement of a size of the first visual fiducial marker or a first multiple of a measurement of a size of the first visual symbol.

For example, with reference to FIGS. 1 and 2, the first image 208 can be the image 100, the indication of the point of gaze of the individual at the time of the production of the image 100 can be the first indication 126, and the first visual fiducial marker can be the first visual fiducial marker 116. For example, the first visual fiducial marker 116 can be disposed at a first position in the image 100 and can include a first visual symbol. The first visual symbol can be associated with the first data that define the first region. For example, the first visual symbol can be the X in the first visual fiducial marker 116. For example, the first region can be the windshield 104. The windshield 104 can have a first shape and a first size. The windshield 104 can be disposed a first displacement in a first direction from the position of the first visual fiducial marker 116. For example, in the system 200, the first visual symbol (i.e., the X in the first visual fiducial marker 116) can be associated with the first data that define: (1) the first shape and the first size of the windshield 104 and (2) the first displacement (e.g., to one or more edges of the windshield 104) in the first direction (e.g., directions that surround the first visual fiducial marker 116) from the position of the first visual fiducial marker 116 at which the windshield 104, having the first shape and the first size, is disposed.

Returning to FIG. 2, the region locator module 210 can include instructions that function to control the processor 202 to determine, using one or more of the first visual symbol or a second visual symbol, one or more locations of the one or more edges of the first region in the first image 208.

For example, the first visual symbol can include a type of visual symbol that has been pre-programmed to represent the first data that define the first region, the first shape, the first size, the first displacement, and the first direction. For example, the type of visual symbol can be a QR code. The instructions to determine the at least one location of the at least one edge of the first region in the first image can include instructions that function to control the processor 202 to determine the first data from the first visual symbol.

Additionally or alternatively, for example, the instructions to determine the at least one location of the at least one edge of the first region in the first image can include instructions that function to control the processor 202 to: (1) determine an identity of the first visual symbol and (2) retrieve, based on the identity, the first data that define the first region, the first shape, the first size, the first displacement, and the first direction.

The matching module 212 can include instructions that function to control the processor 202 to determine that the indication of the point of gaze is within the first region.

The determination module 214 can include instructions that function to control the processor 202 to determine that the time of the production of the first image 208 is within a first duration of time in which the individual observed the first region. For example, if the first image 208 is included in a set of images (e.g., frames in a video) that defines the first duration of time and in which the indication of the point of gaze is within the first region, then the processor 202 can determine that the time of the production of the first image 208 is within the first duration of time.

For example, the measurement of the size of the first visual fiducial marker can include one or more of a measurement of an area of a shape of the first visual fiducial marker, a measurement of an edge of the shape of the first visual fiducial marker, a measurement of a diagonal of the shape of the first visual fiducial marker, a measurement of an axis of the shape of the first visual fiducial marker, or the like.

For example, with reference to FIG. 1, the first visual fiducial marker 116 can have a shape and size (e.g., a square of a specific size). The measurement of the first displacement (e.g., to the one or more edges of the windshield 104) can be a multiple of the measurement of the size of the first visual fiducial marker 116.

Returning to FIG. 2, additionally or alternatively, for example, the measurement of the size of the first visual symbol can include one or more of a measurement of an area of a shape of the first visual symbol, a measurement of an edge of the shape of the first visual symbol, a measurement of a diagonal of the shape of the first visual symbol, a measurement of an axis of the shape of the first visual symbol, or the like.

For example, with reference to FIG. 1, the first visual symbol (i.e., the X in the first visual fiducial marker 116) can have a shape and a size. The measurement of the first displacement (e.g., to the one or more edges of the windshield 104) can be a multiple of the measurement of the size of the first visual symbol.

Returning to FIG. 2, in a first implementation, the first visual symbol can further be associated with second data that define a second region. The second region can have a second shape and a second size. The second region can be disposed a second displacement in a second direction from the position of the first visual fiducial marker. A measurement of the second displacement can be one or more of a second multiple of the measurement of the size of the first visual fiducial marker or a second multiple of the measurement of the size of the first visual symbol. The region locator module 210 can further include instructions that cause the processor 202 to determine, using the first visual symbol, one or more locations of one or more edges of the second region in the first image 208.

For example, at least a portion of the second region can overlap at least a portion of the first region.

For example, with reference to FIGS. 1 and 2, the first visual symbol (i.e., the X in the first visual fiducial marker 116) can further be associated with the second data that define the second region. For example, the second region can be the rearview mirror 106. The rearview mirror 106 can have a second shape and a second size. The rearview mirror 106 can be disposed a second displacement in a second direction from the position of the first visual fiducial marker 116. For example, in the system 200, the first visual symbol (i.e., the X in the first visual fiducial marker 116) can further be associated with the second data that define: (1) the second shape and the second size of the rearview mirror 106 and (2) the second displacement (e.g., to one or more edges of the rearview mirror 106) in the second direction from the position of the first visual fiducial marker 116 at which the rearview mirror 106, having the second shape and the second size, is disposed.

Returning to FIG. 2, in a second implementation, the memory 208 can further store an orientation module 216. The orientation module 216 can include instructions that function to control the processor 202 to determine an orientation of one or more of the first visual fiducial marker or the first visual symbol. The region locator module 210 can further include instructions that cause the processor 202 to adjust, based on the orientation, the first shape.

For example, with reference to FIG. 1, the first visual fiducial marker can be the second visual fiducial marker 118.

For example, the first visual symbol can be the + in the second visual fiducial marker 118. For example, the first region can be the traffic light 108. For example, in the system 200, the first visual symbol (i.e., the + in the second visual fiducial marker 118) can be associated with the first data that define: (1) the first shape and the first size of the traffic light 108 and (2) the first displacement (e.g., to one or more edges of the traffic light 108) in the first direction (e.g., above the second visual fiducial marker 118) from the position of the second visual fiducial marker 118 at which the traffic light 108, having the first shape and the first size, is disposed.

Figure 3:
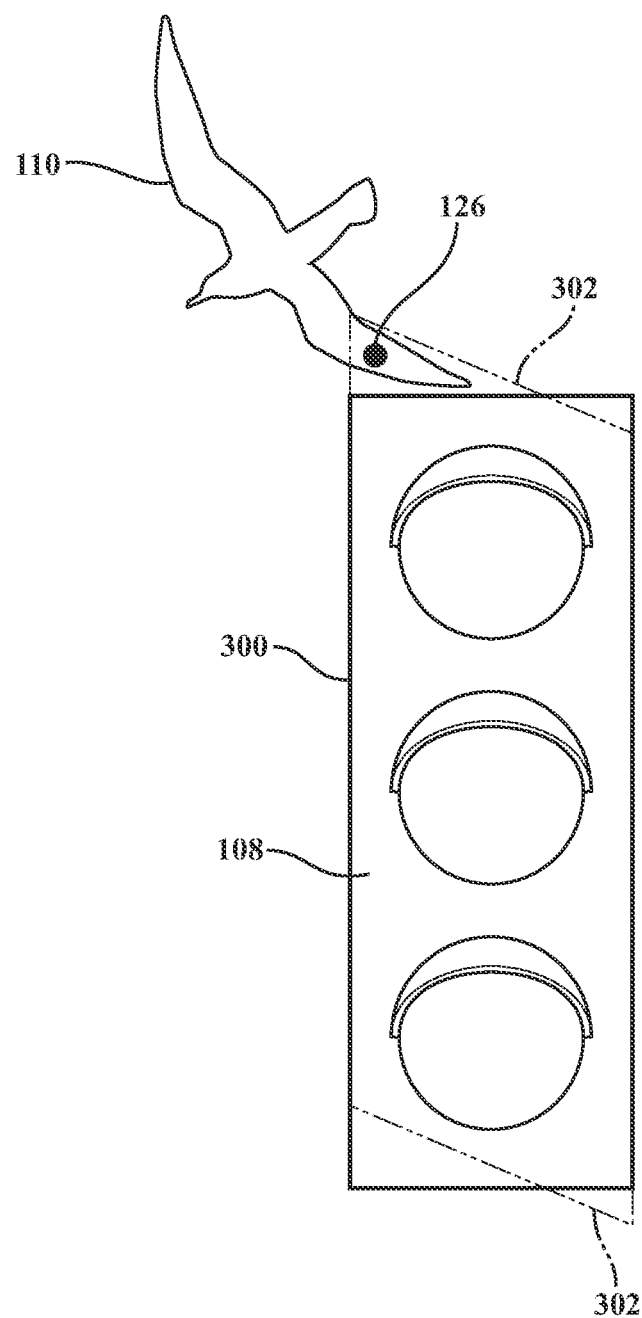
FIG. 3 is a diagram that illustrates an example of a region, in an image, defined by data, for a shape and size of the region, associated with a visual symbol of a visual fiducial marker, according to the disclosed technologies.

FIG. 3 is a diagram that illustrates an example of a region 300, in an image, defined by data, for a shape and size of the region 300, associated with a visual symbol of a visual fiducial marker, according to the disclosed technologies.

For example, with reference to FIGS. 1 and 3, the region 300 can be the region for the traffic light 108. However, because at the time of the production of the image 100 (e.g., a time at which a frame in a video was produced), in the environment 102 a gust of wind can have caused the traffic light 108 to have rotated from its normal position, if the system 200 does not adjust for a change in an orientation of the first shape, of the region 300, then the first indication 126, of the point of gaze of the individual at the time of the production of the image 100, can be at a position of the bird 110, not at a position of the traffic light 108. However, because in the second implementation the orientation module 216 can determine the orientation of one or more of the second visual fiducial marker 118 or the first visual symbol (i.e., the + in the second visual fiducial marker 118), the region locator module 210 can adjust, based on the orientation, the first shape of the region 300 to have a shape 302. For example, the system 200 can determine that one or more of the shape of the second visual fiducial marker 118 in the image 100 or shape of the first visual symbol in the image 100 can be different from one or more of an expected shape of the second visual fiducial marker 118 (e.g., a square) or an expected shape of first visual symbol (i.e., the + in the second visual fiducial marker 118). That is, for example, the system 200 can determine one or more of that: (1) a left side of a horizontal edge of the shape of the second visual fiducial marker 118 in the image 100 is higher than a right side of the horizontal edge of the shape of the second visual fiducial marker 118 in the image 100 or (2) a left side of a horizontal bar of the +(i.e., the first visual symbol) in the second visual fiducial marker 118 is higher than a right side of the horizontal bar of the +(i.e., the first visual symbol) in the second visual fiducial marker 118. Based on such a determination, the orientation module 216 can determine the orientation of the one or more of the second visual fiducial marker 118 or the first visual symbol (i.e., the + in the second visual fiducial marker 118) and the region locator module 210 can adjust, based on the orientation, the first shape of the region 300 to have the shape 302. In this manner, the system 200 can adjust for the change in the orientation of the first shape, of the region 300, so that the first indication 126, of the point of gaze of the individual at the time of the production of the image 100, can be at the position of the traffic light 108, not at the position of the bird 110.

Returning to FIG. 2, in a third implementation, the processor 202 can be further configured to receive a second image 218. The data store 204 can be configured to store, for example, the second image 218. The second image 218 can include an indication of a point of gaze of the individual at a time of a production of the second image 218. The second image 218 can include the first visual fiducial marker. The first visual fiducial marker can be disposed at a position in the second image 218. For example, the position in the second image 218 can correspond to the first position in the first image 208. The region locator module 210 can further include instructions that cause the processor 202 to determine, using the first visual symbol, the one or more locations of the one or more edges of the first region in the second image 218. The matching module 212 can further include instructions that cause the processor 202 to determine that the indication of the point of gaze at the time of the production of the second image 218 is within the first region. The determination module 214 can further include instructions that cause the processor 202 to determine that the time of the production of the second image 218 is within the first duration of time in which the individual observed the first region. Additionally, for example, the memory 206 can further store a timeline module 220. The timeline module 220 can include instructions that function to control the processor 202 to produce a timeline for the first duration of time.

For example, with reference to FIGS. 1 and 2, the first image 208 and the second image 218 can be frames in a video. For example, the first image 208 can be a first frame in a video and the second image 218 can be a second frame in the video. For example, if a frame rate of the video is 24 frames per second and the first image 208 and the second image 218 are consecutive frames, then little may change between the first image 208 and the second image 218 such that: (1) the one or more locations of the one or more edges of the first region in the first image 208 are the one or more locations of the one or more edges of the first region in the second image 218 and (2) a position of the indication of the point of gaze of the individual at the time of the production of the first image 208 (e.g., the first indication 126) can be the position of the indication of the point of gaze of the individual at the time of the production of the second image 218 (e.g., the first indication 126).

Figure 4:
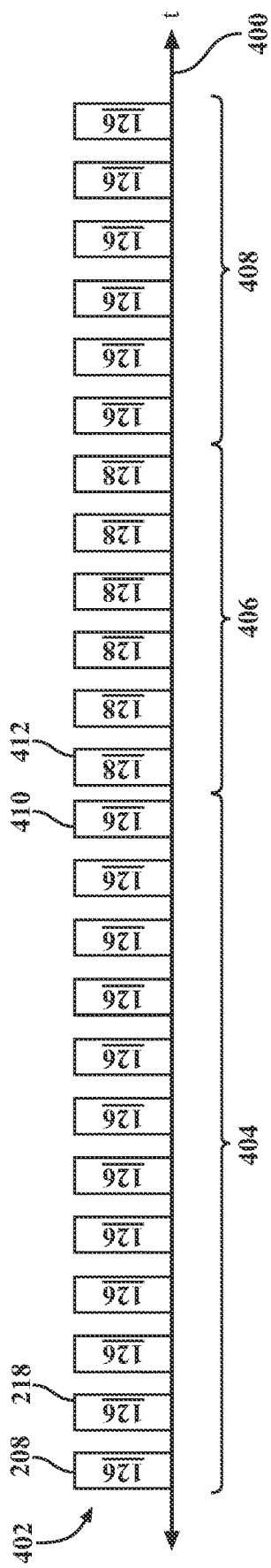
FIG. 4 is an example of a timeline produced by a timeline module, according to the disclosed technologies.

FIG. 4 is an example of a timeline 400 produced by the timeline module 220, according to the disclosed technologies. For example, with reference to FIGS. 1, 2, and 4, the timeline 400 can include, for example, symbols 402 arrayed on an axis for time 404. Each of the symbols 402 can represent, for example, a corresponding image received by the processor 202. For example, the images can be frames in a video. The symbols 402 can include an earliest set of symbols 404, an intermediate set of symbols 406, and a latest set of symbols 408. For example, the earliest set of symbols 404 can include twelve of the symbols 402, the intermediary set of symbols 406 can include six of the symbols 402, and the latest set of symbols 408 can include six of the symbols. For example, the first image 208 and the second image 218 can be represented by two of the symbols 402 in the earliest set of symbols 404. Each of the symbols 402 can identify a specific indication of a point of gaze of an individual at a time of a production of the corresponding image. For example, each of the symbols 402 in the earliest set of symbols 404 can identify the first indication 126, each of the symbols 402 in the intermediary set of symbols 406 can identify the second indication 128, and each of the symbols 402 in the latest set of symbols 408 can identify the first indication 126. For example, if a frame rate of the video is 24 frames per second, then the first duration of time can be one half second.

Returning to FIG. 2, in a fourth implementation, the processor 202 can be further configured to receive the second image 218. The data store 204 can be configured to store, for example, the second image 218. The second image 218 can include an indication of a point of gaze of the individual at a time of a production of the second image 218. The second image 218 can include the first visual fiducial marker. The first visual fiducial marker can be disposed at a position in the second image 218. The first visual symbol can further be associated with second data that define a second region. The second region can have a second shape and a second size. The second region can be disposed a second displacement in a second direction from the position of the first visual fiducial marker. A measurement of the second displacement can be one or more of a second multiple of the measurement of the size of the first visual fiducial marker or a second multiple of the measurement of the size of the first visual symbol. The region locator module 210 can further include instructions that cause the processor 202 to determine, using the first visual symbol, one or more locations of one or more edges of the second region in the second image 218. The matching module 212 can further include instructions that cause the processor 202 to determine that the indication of the point of gaze at the time of the production of the second image 218 is within the second region. The determination module 214 can further include instructions that cause the processor 202 to determine that the time of the production of the second image 218 is within a second duration of time in which the individual observed the second region. Additionally, for example, the memory 206 can further store the timeline module 220. The timeline module 220 can include instructions that function to control the processor 202 to produce a timeline for the first duration of time and the second duration of time. Additionally, for example, the timeline module 220 can further include instructions that cause the processor 202 to determine an order in which the individual observes different items of information presented to the individual.

For example, with reference to FIGS. 1 and 2, the first image 208 and the second image 218 can be frames in a video. For example, if a frame rate of the video is 24 frames per second and the first image 208 and the second image 218 are consecutive frames, then little may change between the first image 208 and the second image 218 such that the image 100 can effectively be both the first image 208 and the second image 218. For example, the indication of the point of gaze of the individual at the time of the production of the first image 208 can be the first indication 126. For example, the indication of the point of gaze of the individual at the time of the production of the second image 218 can be the second indication 128. For example, the first visual fiducial marker can be the first visual fiducial marker 116. The first visual symbol can be associated with the first data that define the first region. The first region can have the first shape and first size. The first region can be disposed the first displacement in the first direction from the position of the first visual fiducial marker. For example, the first region can be the traffic light 108. The first visual symbol can further be associated with the second data that define the second region. The second region can have the second shape and second size. The second region can be disposed the second displacement in the second direction from the position of the first visual fiducial marker. For example, the second region can be the barricade 112.

For example, with reference to FIG. 4, in the fourth implementation, a symbol 410, of the symbols 402, can represent the first image 208, and a symbol 412, of the symbols 402, can represent the second image 218. Again, for example, if the frame rate of the video is 24 frames per second, then the first duration of time can be one half second, and the second duration of time can be one quarter second. In this manner, the processor can determine the order in which the individual observes different items of information presented to the individual.

Returning to FIG. 2, in a fifth implementation, the first image 208 can further include a second visual fiducial marker. The second visual fiducial marker can be disposed at a second position in the first image 208 and can include the second visual symbol. The second visual symbol can be associated with second data that define the first region. The first region can have the first shape and the first size. The first region can be disposed a second displacement in a second direction from a position of the second visual fiducial marker. A measurement of the second displacement can be one or more of a multiple of a measurement of a size of the second visual fiducial marker or a multiple of a measurement of a size of the second visual symbol. Additionally, for example, the region locator module 210 can further include instructions that cause the processor 202 to determine: (1) using the first visual symbol, a first of the one or more locations of the one or more edges of the first region and (2) using the second visual symbol, a second of the one or more locations of the one or more edges of the first region. The matching module 212 can further include instructions that function to control the processor 202 to determine that, based on the first of the one or more locations of the one or more edges of the first region, the indication of the point of gaze is within the first region.

For example, with reference to FIGS. 1 and 2, the first image 208 can be the image 100, the indication of the point of gaze of the individual at the time of the production of the image 100 can be the second indication 128, the first visual fiducial marker can be the fourth visual fiducial marker 122, and the second visual fiducial marker can be the fifth visual fiducial marker 124. For example, the fourth visual fiducial marker 122 can be disposed at a first position in the image 100 and can include a first visual symbol. The first visual symbol can be associated with the first data that define the first region. For example, the first visual symbol can be the symbol with the vertical bar intersected by the two horizontal bars in the fourth visual fiducial marker 122. For example, the fifth visual fiducial marker 124 can be disposed at a second position in the image 100 and can include a second visual symbol. The second visual symbol can be associated with the second data that define the first region. For example, the second visual symbol can be the symbol with the backslash intersected by the two slashes in the fifth visual fiducial marker 124. For example, the first region can be the barricade 112. The barricade 112 can have a first shape and a first size.

The barricade 112 can be disposed a first displacement in a first direction from the position of the fourth visual fiducial marker 122. For example, in the system 200, the first visual symbol (i.e., the symbol with the vertical bar intersected by the two horizontal bars in the fourth visual fiducial marker 122) can be associated with the first data that define: (1) the first shape and the first size of the barricade 112 and (2) the first displacement (e.g., to one or more edges of the barricade 112) in the first direction (e.g., directions that surround the fourth visual fiducial marker 122) from the position of the fourth visual fiducial marker 122 at which the barricade 112, having the first shape and the first size, is disposed. Additionally, the barricade 112 can be disposed a second displacement in a second direction from the position of the fifth visual fiducial marker 124. For example, in the system 200, the second visual symbol (i.e., the symbol with the backslash intersected by the two slashes in the fifth visual fiducial marker 124) can be associated with the second data that define: (1) the first shape and the first size of the barricade 112 and (2) the second displacement (e.g., to one or more edges of the barricade 112) in the second direction (e.g., directions that surround the fifth visual fiducial marker 124) from the position of the fifth visual fiducial marker 124 at which the barricade 112, having the first shape and the first size, is disposed.

Figure 5:
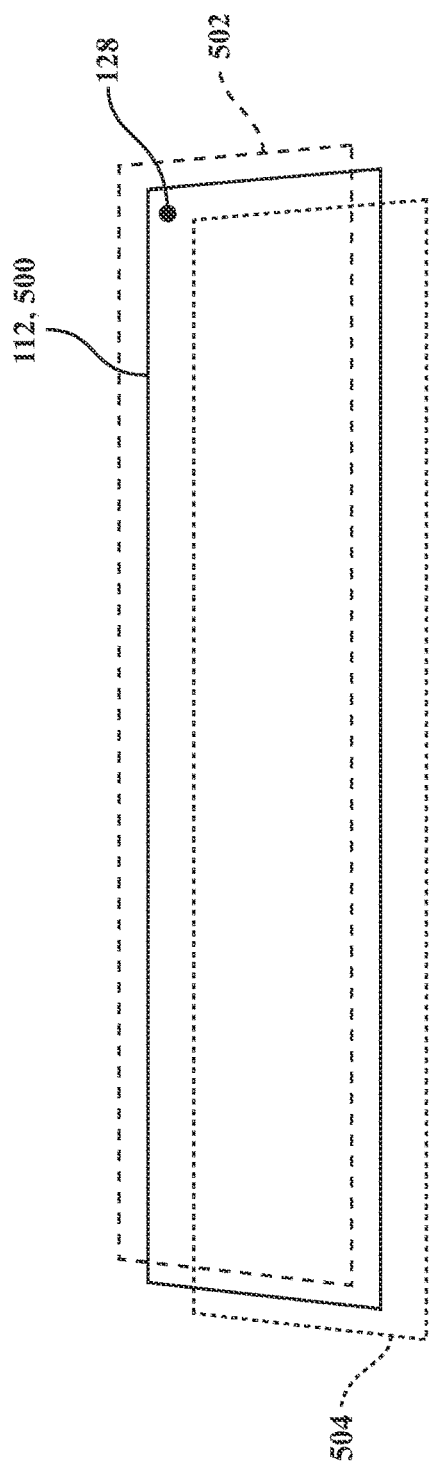
FIG. 5 is a diagram that illustrates an example of a region defined by first data associated with a first visual symbol of a first visual fiducial marker and second data associated with a second visual symbol of a second visual fiducial marker, according to the disclosed technologies.

FIG. 5 is a diagram that illustrates an example of a region 500 defined by first data associated with a first visual symbol of a first visual fiducial marker and second data associated with a second visual symbol of a second visual fiducial marker, according to the disclosed technologies.

For example, with reference to FIGS. 1, 2, and 5, the region 500 can be the region for the barricade 112. A shape 502 can be defined by the first data. The shape 502 can have the first shape and the first size and can be disposed the first displacement in the first direction from the position of the fourth visual fiducial marker 122. A shape 504 can be defined by the second data. The shape 504 can have the second shape and the second size and can be disposed the second displacement in the second direction from the position of the fifth visual fiducial marker 124. Ideally, the shape 502 coincides with the shape 504, which coincide with the edges of the region 500. However, due to inaccuracies (e.g., jitter) associated with a device (not illustrated) that produced the image 100 (e.g., Tobii Pro Glasses 3), the shape 502 (e.g., one or more of the first shape, the first size, the first displacement, or the first direction) can be slightly different from the shape 504 (e.g., one or more of the second shape, the second size, the second displacement, or the second direction).

For example, the region locator module 210 can determine: (1) using the first visual symbol, that the shape 502 is the first of the one or more locations of the one or more edges of the barricade 112 and (2) using the second visual symbol, that the shape 504 is the second of the one or more locations of the one or more edges of the barricade 112. The matching module 212 can determine, based on the shape 502, that the second indication 128 is within the barricade 112.

Having a plurality of visual fiducial markers (e.g., the third visual fiducial marker 120, the fourth visual fiducial marker 122, and the fifth visual fiducial marker 124) disposed on the barricade 112 can provide several advantages. First, as described above, because each of the visual fiducial markers can be associated with a corresponding shape for a same region, a determination that an indication of a point of gaze is within the region can be made based on a determination that the indication is within one or more corresponding shapes. Second, a degree of reliability of the determination that the indication of the point of gaze is within the region can be made based on a count of a number of the corresponding shapes that include the indication. Third, the determination that the indication of the point of gaze is within one of the corresponding shapes, but not within one or more other of the corresponding shapes, may be indicative that the point of gaze is directed to a periphery of the region. Fourth, having the plurality of visual fiducial markers disposed at different positions on the barricade 112 can increase a likelihood that at least one of the visual fiducial markers will be within a field of view of a device (not illustrated) that produced the image 100 (e.g., Tobii Pro Glasses 3) and, therefore, included in the image 100 so that the system 200 200 can have the information needed to determine if the indication of the point of gaze is within the barricade 112. Fifth, having the plurality of visual fiducial markers can allow for a determination that the indication of the point of gaze is within the region to be made in an event in which a portion of at least one, but not all, of the visual fiducial markers is occluded in the image 100. For example, even though at the time of the production of the image 100, in the environment 102 a gust of wind can have caused the tarp 114 to blow such that a portion of the third visual fiducial marker 120 is occluded in the image 100, a determination that the indication of the point of gaze is within the barricade 112 can be made using one or more of the fourth visual fiducial marker 122 or the fifth visual fiducial marker 124.

Figure 6A:
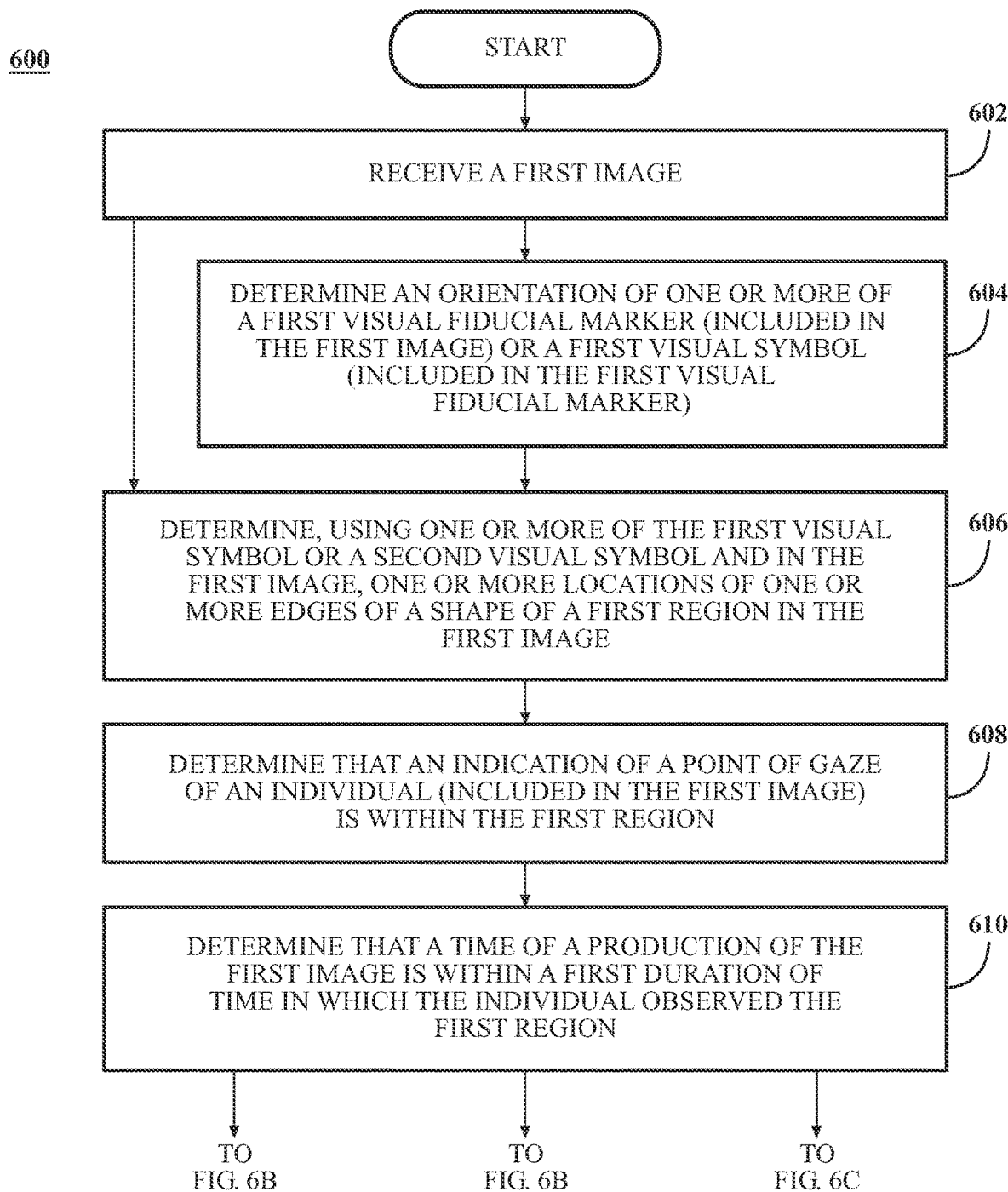
FIGS. 6A through 6C include a flow diagram that illustrates an example of a method that is associated with determining a duration of time in which an individual observed a region, according to the disclosed technologies.
Figure 6B:
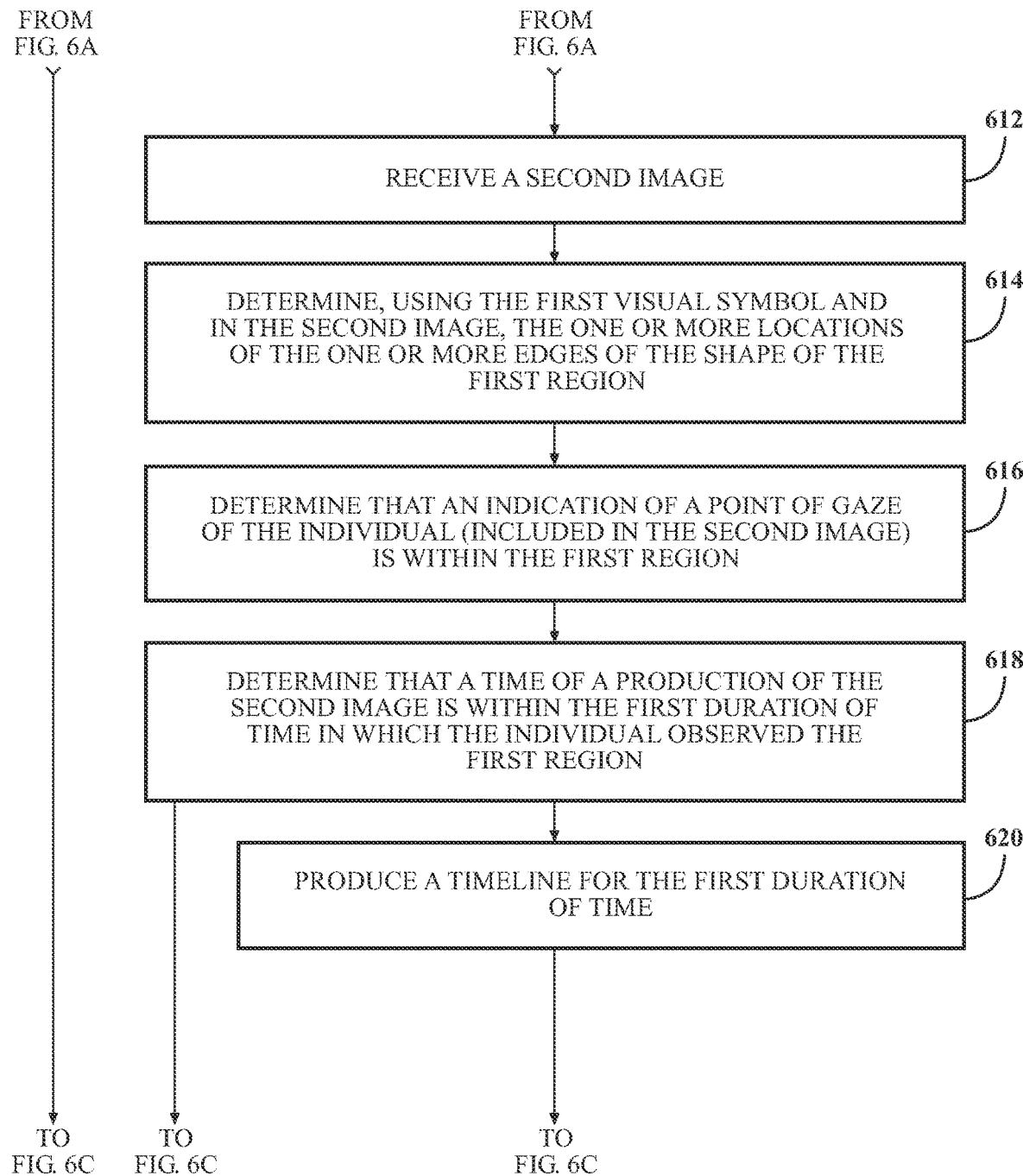
Figure 6C:
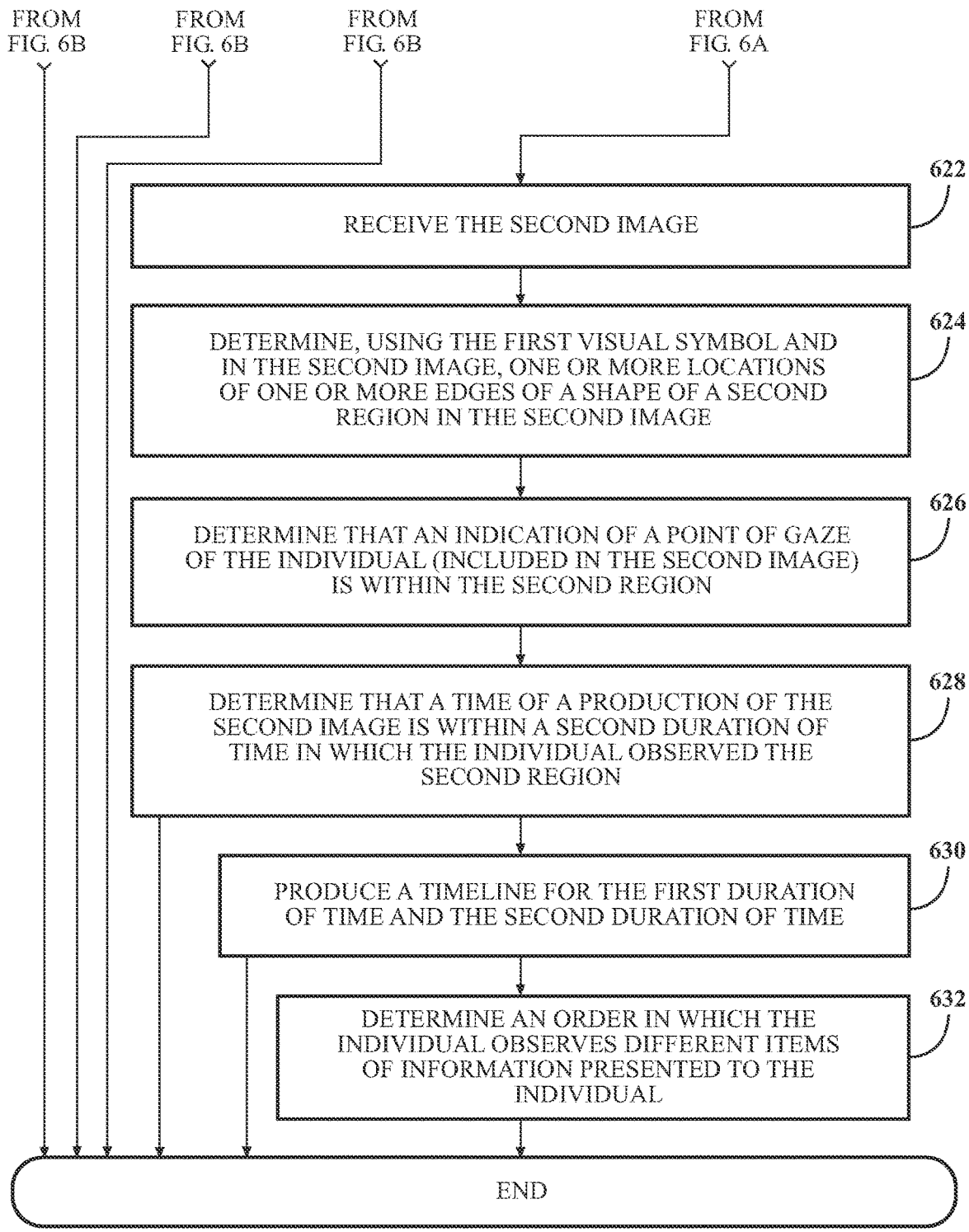

FIGS. 6A through 6C include a flow diagram that illustrates an example of a method 600 that is associated with determining a duration of time in which an individual observed a region, according to the disclosed technologies. The method 600 is described from the perspective of the system 200 illustrated in FIG. 2. Although the method 600 is described in combination with the system 200, one of skill in the art understands, in light of the description herein, that the method 600 is not limited to being implemented by the system 200. Rather, the system 200 is an example of a system that may be used to implement the method 600.

In FIG. 6A, in the method 600, at an operation 602, the processor 202 can receive the first image 208. For example, the processor 202 can receive the first image 208 from an eye point-of-gaze tracking device (not illustrated) worn by the individual. For example, the eye point-of-gaze tracking device can include wearable eye tracker glasses. For example, the wearable eye tracker glasses can be Tobii Pro Glasses 3 distributed by Tobii of Stockholm, Sweden. The first image 208 can include an indication of a point of gaze of the individual at a time of a production of the first image 208. The first image 208 can include a first visual fiducial marker. The first visual fiducial marker can be disposed at a first position in the first image 208 and can include a first visual symbol. The first visual symbol can be associated with first data that define a first region. For example, the first visual symbol can include one or more of a bar code, a QR code, an ARTag code, an AprilTag code, an ARToolKit code, an ArUco code, or the like. The first region can have a first shape and a first size. The first region can be disposed a first displacement in a first direction from a position of the first visual fiducial marker. A measurement of the first displacement can be one or more of a first multiple of a measurement of a size of the first visual fiducial marker or a first multiple of a measurement of a size of the first visual symbol.

For example, the measurement of the size of the first visual fiducial marker can include one or more of a measurement of an area of a shape of the first visual fiducial marker, a measurement of an edge of the shape of the first visual fiducial marker, a measurement of a diagonal of the shape of the first visual fiducial marker, a measurement of an axis of the shape of the first visual fiducial marker, or the like.

Additionally or alternatively, for example, the measurement of the size of the first visual symbol can include one or more of a measurement of an area of a shape of the first visual symbol, a measurement of an edge of the shape of the first visual symbol, a measurement of a diagonal of the shape of the first visual symbol, a measurement of an axis of the shape of the first visual symbol, or the like.

In a first implementation, the first visual symbol can further be associated with second data that define a second region. For example, at least a portion of the second region can overlap at least a portion of the first region. The second region can have a second shape and a second size. The second region can be disposed a second displacement in a second direction from the position of the first visual fiducial marker. A measurement of the second displacement can be one or more of a second multiple of the measurement of the size of the first visual fiducial marker or a second multiple of the measurement of the size of the first visual symbol.

In a second implementation, at an operation 604, the orientation module 216 can determine an orientation of one or more of the first visual fiducial marker or the first visual symbol.

At an operation 606, the region locator module 210 can determine, using one or more of the first visual symbol or a second visual symbol, one or more locations of one or more edges of the first region in the first image. For example, the first visual symbol can include a type of visual symbol that has been pre-programmed to represent the first data that define the first region, the first shape, the first size, the first displacement, and the first direction. For example, the type of visual symbol can be a QR code. In this situation, at the operation 606, the region locator module 210 can determine the one or more locations of the one or more edges of the first region in the first image by determining the first data from the first visual symbol. Additionally or alternatively, for example, at the operation 606, the region locator module 210 can determine the one or more locations of the one or more edges of the first region in the first image by: (1) determining an identity of the first visual symbol and (2) retrieving, based on the identity, the first data that define the first region, the first shape, the first size, the first displacement, and the first direction. In the first implementation, the region locator module 210 can determine, using the first visual symbol, one or more locations of one or more edges of the second region in the first image 208. In the second implementation, the region locator module 210 can adjust, based on the orientation, the first shape.

At an operation 608, the matching module 212 can determine that the indication of the point of gaze is within the first region.

At an operation 610, the determination module 214 can determine that the time of the production of the first image 208 is within a first duration of time in which the individual observed the first region.

In FIG. 6B, in the method 600, in a third implementation, at an operation 612, the processor 202 can receive a second image 218. For example, the first image 208 can be a first frame in a video and the second image 218 can be a second frame in the video. The second image 218 can include an indication of a point of gaze of the individual at a time of a production of the second image 218. The second image 218 can include the first visual fiducial marker. The first visual fiducial marker can be disposed at a position in the second image 218. For example, the position in the second image 218 can correspond to the first position in the first image 208.

In the third implementation, at an operation 614, the region locator module 210 can determine, using the first visual symbol, the one or more locations of the one or more edges of the first region in the second image 218.

In the third implementation, at an operation 616, the matching module 212 can determine that the indication of the point of gaze at the time of the production of the second image 218 is within the first region.

In the third implementation, at an operation 618, the determination module 214 can determine that the time of the production of the second image 218 is within the first duration of time in which the individual observed the first region.

Additionally, for example, in the third implementation, at an operation 620, the timeline module 220 can produce a timeline for the first duration of time.

In FIG. 6C, in the method 600, in a fourth implementation, at an operation 622, the processor 202 can receive the second image 218. The second image 218 can include an indication of a point of gaze of the individual at a time of a production of the second image 218. The second image 218 can include the first visual fiducial marker. The first visual fiducial marker can be disposed at the position in the second image 218. The first visual symbol can further be associated with second data that define a second region. The second region can have a second shape and a second size. The second region can be disposed a second displacement in a second direction from the position of the first visual fiducial marker. A measurement of the second displacement can be one or more of a second multiple of the measurement of the size of the first visual fiducial marker or a second multiple of the measurement of the size of the first visual symbol.

In the fourth implementation, at an operation 624, the region locator module 210 can determine, using the first visual symbol, one or more locations of one or more edges of the second region in the second image 218.

In the fourth implementation, at an operation 626, the matching module 212 can determine that the indication of the point of gaze at the time of the production of the second image 218 is within the second region.

In the fourth implementation, at an operation 628, the determination module 214 can determine that the time of the production of the second image 218 is within a second duration of time in which the individual observed the second region.

Additionally, for example, in the fourth implementation, at an operation 630, the timeline module 220 can produce a timeline for the first duration of time and the second duration of time.

Additionally, for example, in the fourth implementation, at an operation 632, the timeline module 220 can determine an order in which the individual observes different items of information presented to the individual.

In a fifth implementation, the first image 208 can further include a second visual fiducial marker. The second visual fiducial marker can be disposed at a second position in the first image 208 and can include the second visual symbol. The second visual symbol can be associated with second data that define the first region. The first region can have the first shape and the first size. The first region can be disposed a second displacement in a second direction from a position of the second visual fiducial marker. A measurement of the second displacement can be one or more of a multiple of a measurement of a size of the second visual fiducial marker or a multiple of a measurement of a size of the second visual symbol.

Additionally, for example, in the fifth implementation, at the operation 606, the region locator module 210 can determine: (1) using the first visual symbol, a first of the one or more locations of the one or more edges of the first region and (2) using the second visual symbol, a second of the one or more locations of the one or more edges of the first region.

For example, in the fifth implementation, at the operation 608, the matching module 212 can determine that, based on the first of the one or more locations of the one or more edges of the first region, the indication of the point of gaze is within the first region.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 2 and 6A through 6C, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for determining a duration of time in which an individual observed a region, the system comprising:
  one or more processors configured to receive a first image, the first image including:
    an indication of a point of gaze of the individual at a time of a production of the first image, and
    a first visual fiducial marker, the first visual fiducial marker being disposed at a first position in the first image and including a first visual symbol, the first visual symbol being associated with first data that define a first region, the first region having a first shape and a first size and being disposed a first displacement in a first direction from a position of the first visual fiducial marker, a measurement of the first displacement being at least one of a first multiple of a measurement of a size of the first visual fiducial marker or a first multiple of a measurement of a size of the first visual symbol;

a data store communicably coupled to the one or more processors and configured to store the first image; and a memory communicably coupled to the one or more processors and storing:

a region locator module including instructions that when executed by the one or more processors cause the one or more processors to determine, using at least one of the first visual symbol or a second visual symbol, at least one location of at least one edge of the first region in the first image;

a matching module including instructions that when executed by the one or more processors cause the one or more processors to determine that the indication of the point of gaze is within the first region; and a determination module including instructions that when executed by the one or more processors cause the one or more processors to determine that the time of the production of the first image is within a first duration of time in which the individual observed the first region.

2. The system of claim 1, wherein at least one of:

the measurement of the size of the first visual fiducial marker comprises at least one of a measurement of an area of a shape of the first visual fiducial marker, a measurement of an edge of the shape of the first visual fiducial marker, a measurement of a diagonal of the shape of the first visual fiducial marker, or a measurement of an axis of the shape of the first visual fiducial marker; or the measurement of the size of the first visual symbol comprises at least one of a measurement of an area of a shape of the first visual symbol, a measurement of an edge of the shape of the first visual symbol, a measurement of a diagonal of the shape of the first visual symbol, or a measurement of an axis of the shape of the first visual symbol.

3. The system of claim 1, wherein:

the first visual symbol comprises a type of visual symbol that has been pre-programmed to represent the first data that define the first region, the first shape, the first size, the first displacement, and the first direction; and the instructions to determine the at least one location of the at least one edge of the first region in the first image include instructions to cause the one or more processors to determine the first data from the first visual symbol.

4. The system of claim 1, wherein the instructions to determine the at least one location of the at least one edge of the first region in the first image include instructions to cause the one or more processors to:

determine an identity of the first visual symbol; and retrieve, based on the identity, the first data that define the first region, the first shape, the first size, the first displacement, and the first direction.

5. The system of claim 1, wherein:

the first visual symbol further is associated with second data that define a second region, the second region having a second shape and a second size and being disposed a second displacement in a second direction from the position of the first visual fiducial marker, a measurement of the second displacement being at least one of a second multiple of the measurement of the size of the first visual fiducial marker or a second multiple of the measurement of the size of the first visual symbol, and the region locator module further includes instructions that cause the one or more processors to determine, using the first visual symbol and in the first image, at least one location of at least one edge of the second region.

6. The system of claim 5, wherein at least a portion of the second region overlaps at least a portion of the first region.

7. The system of claim 1, wherein:

the memory further stores an orientation module including instructions that when executed by the one or more processors cause the one or more processors to determine an orientation of at least one of the first visual fiducial marker or the first visual symbol, and the region locator module further includes instructions that cause the one or more processors to adjust, based on the orientation, the first shape.

8. The system of claim 1, wherein:

the one or more processors are further configured to receive a second image, the second image including:

an indication of a point of gaze of the individual at a time of a production of the second image, and the first visual fiducial marker, the first visual fiducial marker being disposed at a position in the second image;

the region locator module further includes instructions that cause the one or more processors to determine, using the first visual symbol, the at least one location of the at least one edge of the first region in the second image;

the matching module further includes instructions that cause the one or more processors to determine that the indication of the point of gaze at the time of the production of the second image is within the first region; and the determination module further includes instructions that cause the one or more processors to determine that the time of the production of the second image is within the first duration of time in which the individual observed the first region.

9. The system of claim 8, wherein the position in the second image corresponds to the first position in the first image.

10. The system of claim 8, wherein the memory further stores a timeline module including instructions that when executed by the one or more processors cause the one or more processors to produce a timeline for the first duration of time.

11. The system of claim 1, wherein:

the one or more processors are further configured to receive a second image, the second image including:

an indication of a point of gaze of the individual at a time of a production of the second image, and the first visual fiducial marker, the first visual fiducial marker being disposed at a position in the second image, the first visual symbol further being associated with second data that define a second region, the second region having a second shape and a second size and being disposed a second displacement in a second direction from the position of the first visual fiducial marker, a measurement of the second displacement being at least one of a second multiple of the measurement of the size of the first visual fiducial marker or a second multiple of the measurement of the size of the first visual symbol;

the region locator module further includes instructions that cause the one or more processors to determine, using the first visual symbol, at least one location of at least one edge of the second region in the second image;

the matching module further includes instructions that cause the one or more processors to determine that the indication of the point of gaze at the time of the production of the second image is within the second region; and the determination module further includes instructions that cause the one or more processors to determine that the time of the production of the second image is within a second duration of time in which the individual observed the second region.

12. The system of claim 11, wherein the memory further stores a timeline module including instructions that when executed by the one or more processors cause the one or more processors to produce a timeline for the first duration of time and the second duration of time.

13. The system of claim 12, wherein the timeline module further includes instructions that cause the one or more processors to determine an order in which the individual observes different items of information presented to the individual.

14. The system of claim 1, wherein the first image further includes a second visual fiducial marker, the second visual fiducial marker being disposed at a second position in the first image and including the second visual symbol, the second visual symbol being associated with second data that define the first region, the first region having the first shape and the first size and being disposed a second displacement in a second direction from a position of the second visual fiducial marker, a measurement of the second displacement being at least one of a multiple of a measurement of a size of the second visual fiducial marker or a multiple of a measurement of a size of the second visual symbol.

15. The system of claim 14, wherein:
the region locator module further includes instructions that cause the one or more processors to:
 determine, using the first visual symbol, a first of the at least one location of the at least one edge of the first region; and
 determine, using the second visual symbol, a second of the at least one location of the at least one edge of the first region; and
the matching module further includes instructions that cause the one or more processors to determine, based on the first of the at least one location of the at least one edge of the first region, that the indication of the point of gaze is within the first region.

16. A method for determining a duration of time in which an individual observed a region, the method comprising:

receiving, by a processor, an image, the image including:
 an indication of a point of gaze of the individual at a time of a production of the image, and
 a visual fiducial marker, the visual fiducial marker being disposed at a position in the image and including a visual symbol, the visual symbol being associated with data that define the region, the region having a shape and a size and being disposed a displacement in a direction from a position of the visual fiducial marker, a measurement of the displacement being at least one of a multiple of a measurement of a size of the visual fiducial marker or a multiple of a measurement of a size of the visual symbol;

determining, by the processor, using the visual symbol, at least one location of at least one edge of the region in the image;

determining, by the processor, that the indication of the point of gaze is within the region; and determining, by the processor, that the time of the production of the image is within the duration of time in which the individual observed the region.

17. The method of claim 16, wherein the receiving the image comprises receiving the image from an eye point-of-gaze tracking device worn by the individual.

18. The method of claim 17, wherein the eye point-of-gaze tracking device comprises wearable eye tracker glasses.

19. The method of claim 16, wherein the visual symbol comprises at least one of a bar code, a QR code, an ARTag code, an AprilTag code, an ARToolKit code, or an ArUco code.

20. A non-transitory computer-readable medium for determining a duration of time in which an individual observed a region, the non-transitory computer-readable medium including instructions that when executed by one or more processors cause the one or more processors to:

receive an image, the image including:
 an indication of a point of gaze of the individual at a time of a production of the image, and
 a visual fiducial marker, the visual fiducial marker being disposed at a position in the image and including a visual symbol, the visual symbol being associated with data that define the region, the region having a shape and a size and being disposed a displacement in a direction from a position of the visual fiducial marker, a measurement of the displacement being at least one of a multiple of a measurement of a size of the visual fiducial marker or a multiple of a measurement of a size of the visual symbol;

determine, using the visual symbol, at least one location of at least one edge of the region in the image;

determine that the indication of the point of gaze is within the region; and determine that the time of the production of the image is within the duration of time in which the individual observed the region.

* * * * *